United States Patent
Xiao et al.

(10) Patent No.: US 8,405,853 B2
(45) Date of Patent: *Mar. 26, 2013

(54) DYNAMIC DEVMODE SUPPORT

(75) Inventors: Zhenning Xiao, Renton, WA (US); Senthil K. Selvaraj, Snoqualmie, WA (US)

(73) Assignee: Ricoh Company, Ltd., Tokyo (JP)

( * ) Notice: Subject to any disclaimer, the term of this patent is extended or adjusted under 35 U.S.C. 154(b) by 558 days.

This patent is subject to a terminal disclaimer.

(21) Appl. No.: 12/534,014

(22) Filed: Jul. 31, 2009

(65) Prior Publication Data

US 2011/0026072 A1 Feb. 3, 2011

(51) Int. Cl.
G06F 3/12 (2006.01)
G06K 15/00 (2006.01)

(52) U.S. Cl. .............. 358/1.15; 358/1.13; 358/1.14; 358/1.16

(58) Field of Classification Search ............ 358/1.13, 358/1.14, 1.15, 1.16
See application file for complete search history.

(56) References Cited

U.S. PATENT DOCUMENTS

| | | | |
|---|---|---|---|
| 5,467,434 A | 11/1995 | Hower et al. | |
| 5,513,126 A | 4/1996 | Harkins et al. | |
| 5,768,483 A | 6/1998 | Maniwa et al. | |
| 5,845,076 A | 12/1998 | Arakawa | |
| 5,875,350 A | 2/1999 | Comp et al. | |
| 5,996,029 A | 11/1999 | Sugiyama et al. | |
| 5,999,945 A | 12/1999 | Lahey et al. | |
| 6,594,028 B1 | 7/2003 | Hamamoto et al. | |
| 6,607,314 B1 | 8/2003 | McCannon et al. | |
| 6,789,111 B1 | 9/2004 | Brockway et al. | |
| 7,304,758 B2 | 12/2007 | Ferlitsch | |
| 7,821,667 B2 | 10/2010 | Bahl et al. | |
| 7,903,267 B2 | 3/2011 | Yasui et al. | |

(Continued)

FOREIGN PATENT DOCUMENTS

| JP | 2003233482 A | 8/2003 |
|---|---|---|
| JP | 2005148953 A | 6/2005 |

(Continued)

OTHER PUBLICATIONS

U.S. Appl. No. 12/533,999, filed Jul. 31, 2009, Office Action, mailed Dec. 29, 2011.

(Continued)

*Primary Examiner* — Charlotte M Baker
*Assistant Examiner* — Rury Grisham
(74) *Attorney, Agent, or Firm* — Hickman Palermo Truong Becker Bingham Wong LLP; Daniel D. Ledesma

(57) ABSTRACT

A method and apparatus is provided for printing to a Web services-enabled printing device. A print driver executing on a client device receives, from the printing device, printing device capability data that specifies a plurality of features and options currently supported by the printing device. The print driver generates a second version of a DEVMODE data structure from a first version. A portion of the DEVMODE data structure indicates, in XML, a particular print feature and one or more options for the particular print feature that are indicated in the printing device capability data. A user interface is generated based on the second version. A third version of the DEVMODE data structure is generated and indicates that an option of the particular print feature is selected. The print driver generates a print job ticket based the third version of the DEVMODE data structure.

20 Claims, 9 Drawing Sheets

U.S. PATENT DOCUMENTS

| | | |
|---|---|---|
| 2001/0050684 A1 | 12/2001 | Smith |
| 2002/0030840 A1 | 3/2002 | Itaki et al. |
| 2002/0054339 A1 | 5/2002 | Arakawa |
| 2002/0067504 A1 | 6/2002 | Salgado et al. |
| 2002/0171857 A1 | 11/2002 | Hisatomi et al. |
| 2002/0174444 A1 | 11/2002 | Gatto et al. |
| 2003/0033368 A1 | 2/2003 | Tominaga |
| 2003/0048473 A1 | 3/2003 | Rosen |
| 2003/0184782 A1* | 10/2003 | Perkins et al. ............... 358/1.13 |
| 2003/0217124 A1 | 11/2003 | Parry |
| 2003/0231328 A1* | 12/2003 | Chapin et al. ............... 358/1.13 |
| 2004/0111418 A1 | 6/2004 | Nguyen et al. |
| 2004/0179231 A1 | 9/2004 | Savino et al. |
| 2005/0012951 A1 | 1/2005 | Madril, Jr. et al. |
| 2005/0046886 A1 | 3/2005 | Ferlitsch |
| 2005/0099650 A1 | 5/2005 | Brown et al. |
| 2005/0213136 A1 | 9/2005 | Noyama et al. |
| 2006/0023244 A1 | 2/2006 | Mitsui |
| 2006/0109505 A1 | 5/2006 | Ha et al. |
| 2006/0120349 A1 | 6/2006 | Taylor et al. |
| 2007/0002368 A1 | 1/2007 | Corona |
| 2007/0136485 A1 | 6/2007 | Mitsui |
| 2007/0174521 A1 | 7/2007 | Aritomi |
| 2007/0214409 A1 | 9/2007 | Miyata |
| 2007/0263242 A1 | 11/2007 | Takahashi |
| 2008/0068635 A1 | 3/2008 | Asano |
| 2008/0301277 A1 | 12/2008 | Tsujiguchi |
| 2009/0033976 A1 | 2/2009 | Ding |
| 2009/0086259 A1 | 4/2009 | Bailey et al. |
| 2009/0190150 A1 | 7/2009 | Selvaraj et al. |
| 2010/0027040 A1 | 2/2010 | Kuroda |
| 2010/0225958 A1 | 9/2010 | Selvaraj et al. |
| 2011/0026071 A1* | 2/2011 | Xiao et al. ............... 358/1.15 |

FOREIGN PATENT DOCUMENTS

| | | |
|---|---|---|
| JP | 2005228148 A | 8/2005 |
| WO | WO 2004/070607 A1 | 8/2004 |

OTHER PUBLICATIONS

U.S. Appl. No. 11/846,869, filed Aug. 29, 2007, Final Office Action, mailed Oct. 27, 2011.

European Patent Office, "European Search Report", application No. EP 07250298, dated Feb. 23, 2010, 8 pages.

U.S. Appl. No. 11/846,884, filed Aug. 29, 2007, Advisory Action, mailed Sep. 19, 2011.

U.S. Appl. No. 11/846,884, filed Aug. 29, 2007, Office Action, mailed Oct. 26, 2011.

U.S. Appl. No. 11/846,884, filed Aug. 29, 2007, Notice of Allowance, mailed Mar. 1, 2012.

* cited by examiner

DYNAMIC DEVMODE SUPPORT

CROSS-REFERENCE TO RELATED APPLICATIONS

This application is related to U.S. patent application Ser. No. 12/399,884, filed Mar. 6, 2009 and U.S. patent application Ser. No. 12/533,999, filed Jul. 31, 2009, the entire contents of which are hereby incorporated by reference as if fully set forth herein.

FIELD OF THE INVENTION

The present invention relates generally to printing systems and printing to Web services-enabled printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web Services

The World Wide Web Consortium ("W3C") is an international consortium that develops standards for the World Wide Web. The W3C defines a "Web service" as a software system that is designed to support interoperable machine-to-machine interaction over a network. This definition encompasses many different systems, but in common usage, the term refers to those services that use Simple Object Access Protocol (SOAP)-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define Web services are intentionally modular, and, as a result, there is no one document that defines all Web services. Instead, there are a few core specifications that are supplemented by other specifications as the circumstances and choice of technology dictate. Common core specifications are SOAP, WSDL, WS-Discovery, WS-MetadataExchange, WS-Addressing, and WS-Security. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

WSD Devices

Some devices that host one or more Web services also implement the Devices Profile for Web Services (DPWS) specification. Such devices are referred to as Web Services for Devices (WSD) devices. Non-limiting examples of WSD devices include scanners, printers, copiers, facsimile machines, archiving devices, and multifunction peripherals (MFPs) that provide multiple services (e.g., printing, copying, and scanning services) on the same device.

DPWS defines a minimal set of implementation constraints to enable secure Web Service messaging, discovery, description, and eventing on devices. The DPWS specification defines an architecture in which devices run two types of services: hosting services and hosted services. Hosting services are directly associated to a device and play an important part in the device discovery process. Hosted services are mostly functional and depend on their hosting device for discovery.

DPWS builds on the following core Web Services standards: WSDL 1.1, XML Schema, SOAP 1.2, WS-Addressing, and further comprises WS-MetadataExchange, WS-Transfer, WS-Policy, WS-Security, WS-Discovery and WS-Eventing. The latest DPWS specification (published in February, 2006) is incorporated herein by reference as if fully disclosed herein. A device that implements one or more Web Services standards is referred to herein as a Web services-enabled device.

Service Specifications

Some Web services conform to certain service specifications. A service specification (e.g., WSD Print Service specification) describes the minimum set of APIs that a Web service must implement in order to be compliant with that service specification. For example, a WSD Print Service specification defines (a) a set of operations (e.g., described in a WSDL file) that a print Web service is capable of processing and (b) the events that the print Web service generates. A WSD Scanner Service specification defines (a) a set of operations that a scan Web service is capable of processing and (b) the events that the scan Web service generates.

Service specifications may be standardized by W3C or another Web Services standardizing body, such as the Organization for the Advancement of Structured Information Standards (OASIS).

Printing to a Printing Device

When a user wishes to print an electronic document on a printing device, a print subsystem on the user's client device processes application data generated by an application program and generates print data. The print data includes all the information required by the printing device to print the electronic document. For example, a user creates an electronic document using a word processing application on a PC. The user then selects a print option in the word processing application to request that the electronic document be printed to a particular printer. The print subsystem on the PC processes this request by processing the application data generated by the word processing application to generate print data in a format supported by the particular printer. The print subsystem then sends the print data to the particular printer. Generally, print data is sent to a printing device as part of a print job that is recognized by the printing device.

Generating print data conventionally involves the use of a print driver that is specific to the target printing device. That is, each print driver converts print data into a format supported by the target printing device. Therefore, in order for a client device to correctly print to a particular printing device, the client device must have installed on it the print driver for the particular printing device. One of the problems with this approach is that the print driver must be current for the target printing device. If the configuration of a printing device changes, then a new print driver must be generated and distributed to a large number of users. Printing device manufacturers attempt to provide current print drivers available on their Website for download, but many users do not know to check a manufacturer's Website for current drivers. Furthermore, many print drivers must be digitally certified by the company that makes the operating system or by printing device manufactures, which can be time consuming and expensive. Any changes to a print driver typically trigger a digital re-certification requirement.

Devmode

DEVMODE is a basic data structure that the Windows spooling system uses to process print data. DEVMODE contains the device settings selected by a user (and/or set as default settings) as part of processing a print job. To create a print job from a Windows application, a user interface is presented to a user to allow the user to select a number of options for various features that are currently supported by a particular printing device. The application stores the user's selections into a DEVMODE structure. The application then sends the DEVMODE structure to the print driver of the particular printing device. The print driver interprets the DEVMODE settings and renders the print data into a format that is acceptable by the particular printing device.

The traditional DEVMODE structure is a static binary data structure that is hardcoded within a print driver. If a new device feature is plugged in (or otherwise added) to a printing device (even a Web services-enabled printing device) and the new device feature is not defined in the corresponding print driver, then the new device feature cannot be used in printing. This is because the print driver cannot automatically extend the DEVMODE size to contain the new feature.

SUMMARY

Techniques are provided for printing to a Web services-enabled printing device. In an embodiment, a print driver, executing on a client device, receives, from a Web services-enabled printing device, printing device capability data that specifies a plurality of features and options currently supported by the Web services-enabled printing device. In response to receiving the printing device capability data, the print driver generates a second version of a DEVMODE data structure from a first version of the DEVMODE data structure. The first version indicates a first plurality of features that were previously supported by the Web services-enabled printing device. The second version indicates a second plurality of features that are currently supported by the Web services-enabled printing device. The first plurality of features are different than the second plurality of features. Data in a first portion of the second version is represented in a binary format and data in a second portion of the second version is represented in XML. The second portion indicates a particular print feature and one or more options for the particular print feature that are indicated in the printing device capability data. A user interface is generated based on the second version of the DEVMODE data structure. In response to one or more user selections, a third version of the DEVMODE data structure is generated that indicates that an option is selected for each feature of a set of features of the second plurality of features. The print driver may then generate a print job ticket based at least upon the third version of the DEVMODE data structure. The print driver causes print data and the print job ticket to be transmitted to the Web services-enabled printing device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview
II. Printing System Architecture
III. Generating Printer Description Data
IV. DEVMODE Data Structure
V. Updating DEVMODE
VI. Implementation Mechanisms I. Overview An approach is provided for printing to a Web services-enabled printing device. A print driver generates (or updates) a DEVMODE structure based on a new set of features specified in printing device capabilities data retrieved from a Web services-enabled printing device, e.g., using WSD communication protocols. The new feature(s) and options are saved as XML data in a particular sub-portion of the DEVMODE structure. An application program later accesses the DEVMODE structure and modifies its copy of the DEVMODE structure to indicate which features and options a user selected. The modified DEVMODE structure is passed to the print driver, which generates a print job ticket based at least upon the modified DEVMODE structure. The print driver causes the print job ticket and print data to be transmitted to the Web services-enabled printing device for processing. Embodiments of the invention also include the print driver subscribing to receive events (generated by the Web services-enabled printing device) that indicate when a change has occurred to the installed features and options. The print driver is configured to, in response to such an event, update the DEVMODE structure.

This approach allows a dynamically synchronized DEVMODE structure that reflects the current features and options of a Web services-enabled printing device. A print driver is able to be notified whenever any device feature changes, such as through an event generated when a new device feature is added or when a device feature is removed. Accordingly, a user can always initiate a print job based on the current features supported by the Web services-enabled printing device. Another advantage is that the dynamic portion of the DEVMODE structure is readable by application programs. If the dynamic portion of the DEVMODE structure is not readable (e.g., the dynamic portion being in a binary format), then application programs would be incapable of reading and properly interpreting any new device features indicated in the dynamic portion. For example, if a new hole punch feature is added to a printing device and the new feature is mapped to the number 30 in binary, an application program would not be able to display the new hole punch feature because the application program does not know what the number 30 in binary represents.

Figure 1:
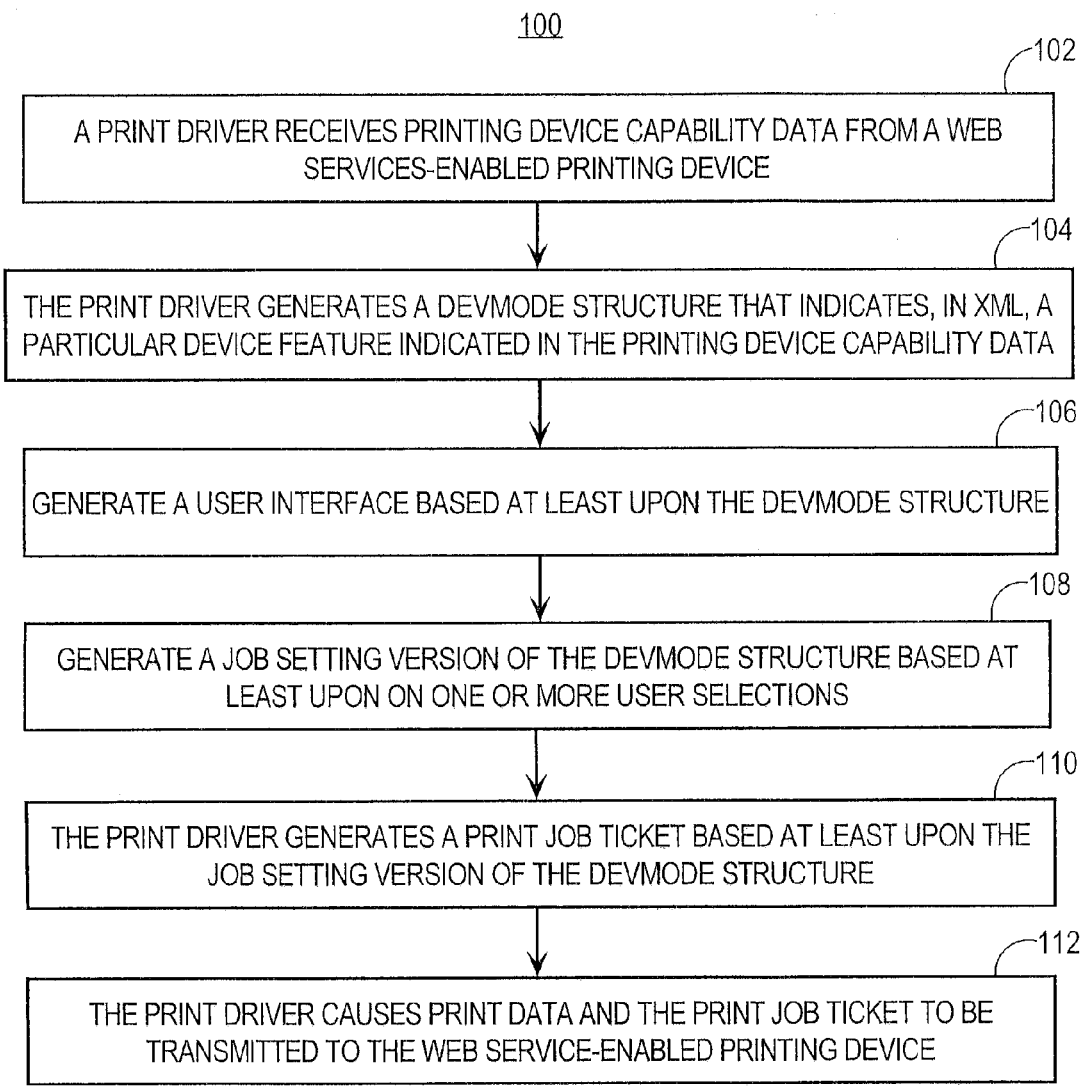
FIG. 1 is a flow diagram that depicts an approach for printing to a printing device, according to one embodiment of the invention.

FIG. 1 is a flow diagram that depicts an approach for printing to a printing device, according to one embodiment of the invention. In step 102, a print driver, executing on a client device, receives printing device capabilities data from a Web services-enabled printing device. The printing device capabilities data specifies a plurality of features and options currently supported by the Web services-enabled printing device.

In step 104, the print driver generates a DEVMODE data structure that indicates, in XML, a particular device feature that is indicated in the printing device capability data. The DEVMODE data structure may be generated based at least upon the printing device capability data or upon printer description data (described in more detail below). The print driver generates printer description data based at least upon the printing device capabilities data.

In step 106, a user interface is generated based at least upon the DEVMODE data structure. The user interface displays features and options that are currently supported by the Web services-enabled printing device. Either the print driver or an application program generates the user interface.

In step 108, a job setting (or default setting) version of the DEVMODE structure is generated, either by the application program or the print driver. The job setting version of the DEVMODE structure indicates which features and options are selected. The selected features and options may be default selections and/or selections from a user.

In step 110, the print driver generates print data and a print job ticket based at least upon the job setting version of the DEVMODE structure.

In step 112, the print driver causes the print data and the print job ticket to be transmitted to the Web services-enabled printing device for processing.

II. Printing System Architecture

Figure 2:
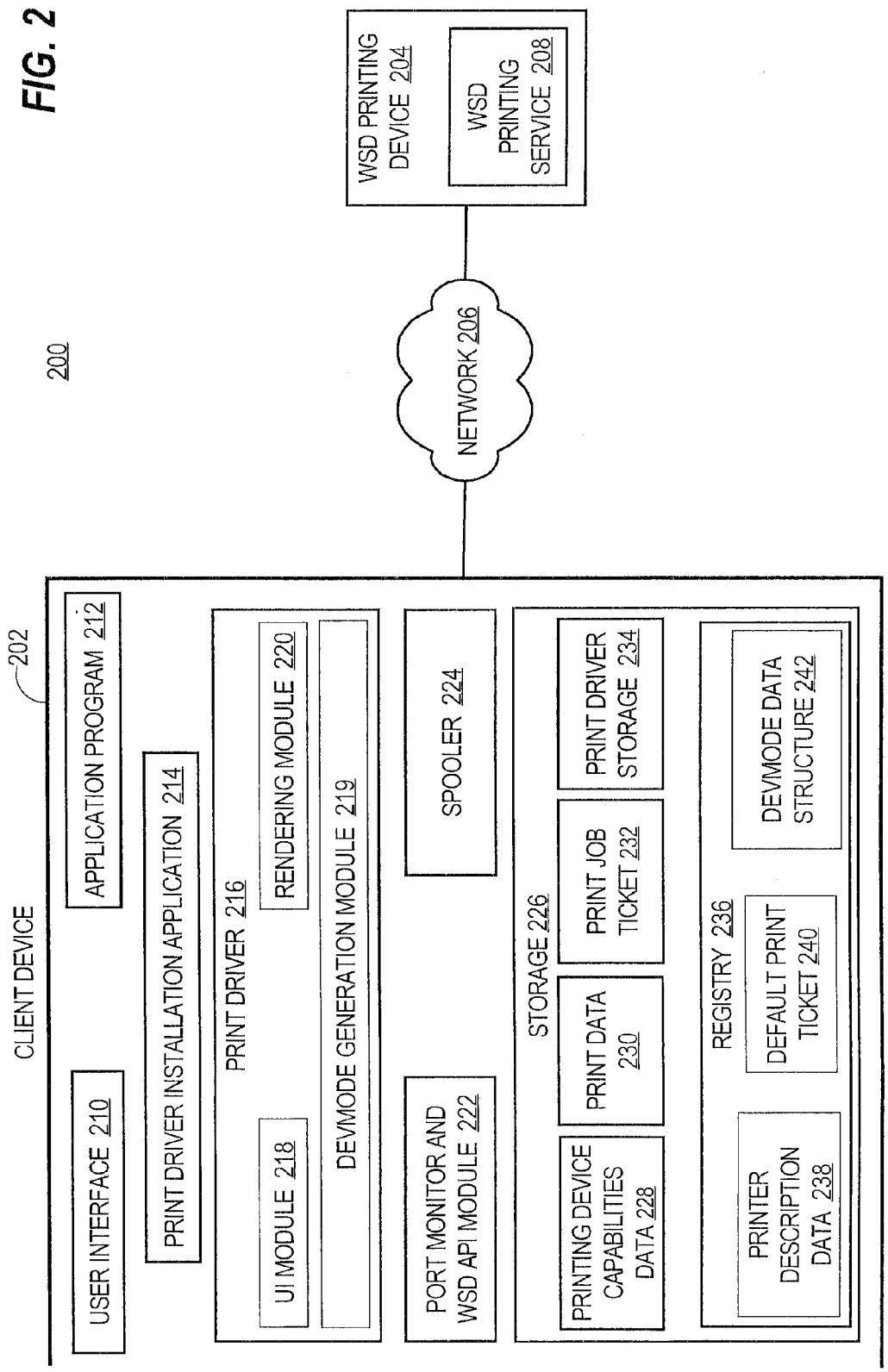
FIG. 2 is a block diagram that depicts an example printing arrangement, according to an embodiment of the invention.

FIG. 2 is a block diagram that depicts an example printing arrangement 200 that includes a client device 202 and a Web services-enabled printing device 204 communicatively coupled via a network 206. Network 206 may be implemented by any medium or mechanism that provides for the exchange of data between client device 202 and Web services-enabled printing device 204. Examples of network 206 include, without limitation, a network such as a Local Area Network (LAN), Wide Area Network (WAN), Ethernet or the Internet, or one or more terrestrial, satellite or wireless links.

Web services-enabled printing device 204 includes a Web services-enabled printing service 208. Client device 202 includes a user interface 210, an application program 212, a print driver installation application 214, a print driver 216, with a User Interface (UI) module and a rendering module 220, a port monitor and Web Services Device (WSD) Application Program Interface (API) module 222, a spooler 224 and a storage 226. Storage 226 stores printing device capabilities data 228, print data 230 and a print job ticket 232. Storage also includes a print driver storage 234 and a registry 236 that stores printer description data 238 and a default print ticket 240. Each of these elements is briefly described below and in more detail hereinafter.

User interface 210 is a mechanism and/or medium for presenting information to a user and allowing user input. Application program 212 may be any type of program that prints data. Examples of application program 212 include, without limitation, a word processing program, a spreadsheet program, an email client, etc. A single application program 212 is depicted in FIG. 2 for purposes of explanation, but client device 202 may have any number of application programs.

Print driver installation application 214 performs installation of print driver 216 which may include installing any data or files required by print driver 216. Installation of print driver 216 may also include obtaining data and/or files from other sources and locations, depending upon an implementation, as well as performing any configuration required by an operating system.

Print driver 216 interacts with application program 212 to generate print data for printing on Web services-enabled printing device 204. UI module 218 generates graphical user interface data which, when processed by application program 212, provides a graphical user interface on user interface 210 for a user to select the features and options to be used when printing a particular electronic document. Rendering module 220 processes application data generated by application program 212 and generates print data which, when processed by Web services-enabled printing device 204, cause a printed version of an electronic document reflected in the print data to be printed at Web services-enabled printing device 204. Print driver 216 performs various other functions that are described in more detail hereinafter.

Port monitor and WSD API module 222 allows communications between print driver 216 and Web services-enabled printing device 204. For example, the WSD API module 222 may be installed on a custom port and print driver 216 communicates with the WSD API module 222 via the custom port. The port monitor and WSD API module 222 communicates with Web services-enabled printing device 204. Thus, port monitor and WSD API module 222 is capable of converting client side commands, e.g., BiDi function calls, to SOAP requests, in the form of SOAP envelopes, and is also capable of extracting XML information from SOAP responses received from Web services-enabled printing device 204, in the form of SOAP envelopes, and generating BiDi function call responses. Port monitor and WSD API module 222 sends SOAP requests to the port associated with Web services-enabled printing service 208.

Printing device capabilities data 228 is data that specifies the current features and options, i.e., allowed values for each feature, of Web services-enabled printing device 204.

Examples of printing device features include, without limitation, a paper tray, duplex printing, stapling, hole punching, etc. Each feature has one or more options, i.e., values. Some features may only have two options. For example, duplex unit has two options, such as "Installed" or "Not Installed." Other features, for example, paper size, may have many options, e.g., "A4", "legal", "81/2×11", etc. Printing device capabilities data 228 stored on client device 202 may include printing device capability data for any number of Web services-enabled printing devices.

Print data 230 is data generated by print driver 216, based at least upon application data generated by application program 212, which when processed by Web services-enabled printing device 204, causes a printed version of an electronic document represented in the print data 230 to be printed. Print job ticket 232 specifies one or more parameters that indicate how print data 230 is to be processed at Web services-enabled printing device 204. Print data 230 may include data for multiple print jobs and print job ticket 232 may include multiple print job tickets.

Print driver storage 234 contains one or more print drivers that are used by client device to print on printing devices. Registry 236 is an area of storage 226 for storing printer description data 238, default print ticket 240, and DEVMODE data structure 242 (hereinafter "DEVMODE structure 242"). Registry 236 may be a protected area of storage 226 that is under the control of an operating system on client device 202. Default print ticket 240 includes data that indicates default options for the features supported by Web services-enabled printing device 204. Default print ticket 240 may include default print tickets for any number of printing devices. Likewise, DEVMODE structure 242 may include DEVMODE data structures for any number of printing devices.

Print driver 216 generates printer description data 238 based at least upon printing device capabilities data 228. Printer description data 238 specifies display data for one or more feature and options currently supported by Web services-enabled printing device 204. Print driver 216 uses printer description data 238 to generate graphical user interface data and also for generating print data 230 and/or print job ticket 232.

III. Generating Printer Description Data

As previously described herein, UI module 218 is configured to generate and store, in registry 236, printer description data 238 and is also configured to store default print tickets received from WSD printing device 204. Printer description data 238 is used by UI module 218 to generate GUI data which, when processed by application program 212, causes a GUI to be displayed on user interface 210 that displays the features and options supported by WSD printing device 204 and allows a user to select one or more features and options to be used when printing a particular electronic document.

The process for generating printer description data 238 generally involves combining information from the printing device capabilities data 228 for WSD printing device 204 and data from Core Mapping Data that is provided as part of the basic installed print driver.

According to one embodiment of the invention, UI module 218 examines the printing device capabilities data 228 and identifies the printing device features specified therein. For each feature in printing device capabilities data 228, UI module 218 determines whether the feature is defined in the core mapping data. Core mapping data includes PDLKeywords and rcNameIDs for a standard set of printing device features and options. If a particular feature in printing device capabilities data 228 is defined in the core mapping data, then UI module 218 retrieves a PDLkeyWord value and rcNameID Value for the particular feature and each of the corresponding options from the core mapping file and stores the PDLkeyWord values and the rcNameID Values in printer description data 238. The PDLkeyWord value provides a mapping between a feature or option terminology understood by print driver 216 and the terminology understood by WSD printing service 208 for the same feature or option. The rcNameID Value indicates the name of a string variable (resource ID) that contains the string for the feature or option. The string is included in the GUI data that is generated by UI module 218 and provided to application program 212. Consider the following example. Suppose that printing device capabilities data 228 includes a feature named "InputTray4". Suppose further that this feature is defined in the core mapping data as indicated below in Table I.

TABLE I

```
<DeviceFeature Value="InputTray4">
    <PDLKeyword Value="InputTray4"/>
    <rcNameID Value="RC_STR_TRAY4" />
    <FeatureOption Value="NotInstalled">
        <PDLKeyword Value="NotInstalled" />
        <rcNameID Value="RC_STR_NOTINSTALLED" />
    </FeatureOption >
    <FeatureOption Value="Installed">
        <PDLKeyword Value="Installed" />
        <rcNameID Value="RC_STR_INSTALLED" />
    </FeatureOption >
</DeviceFeature >
```

As indicated in Table I, the feature InputTray4 has two options that include "NotInstalled" and "Installed". Note that the feature and each option has both a specified PDLKeyword value and a specified rcNameID value, which UI module 218 retrieves and stores in printer description data.

If the particular feature in printing device capabilities data 228 is not defined in the core mapping file, then the particular feature is typically a new feature. In this situation, UI module 218 uses the feature name for the particular feature from the printing device capabilities data 228 to generate the PDLkeyWord value for printer description data 238. In addition, UI module 218 includes the DisplayName values for the particular feature in printer description data 238. Multiple DisplayName values may be included in printer description data 238 for each feature and/or option to provide support for multiple languages. The display name values are included in the GUI data that is generated by UI module 218 and provided to application program 212. Referring to the prior example, suppose that the feature named "InputTray4" is not defined in the core mapping data. Suppose further that this feature is defined in printing device capabilities data 228 as indicated below in Table II.

TABLE II

```
<rodp:InputTray4>
    <rodp:DisplayName xml:lang="en-US">Tray 4</rodp:DisplayName>
    <rodp:DefaultOption>NotInstalled</rodp:DefaultOption>
    <rodp:InputTray4Entry Name="NotInstalled">
      <rodp:DisplayName xml:lang="en-US">Not Installed
      </rodp:DisplayName>
    </rodp:InputTray4Entry>
    <rodp:InputTray4Entry Name="Installed">
      <rodp:DisplayName xml:lang="en-US">Installed
      </rodp:DisplayName>
    </rodp:InputTray4Entry>
</rodp:InputTray4>
```

As indicated in TABLE II, there are no PDLKeyword values or rcNameID values contained in the definition of the InputTray4 feature in printing device capabilities data 228. In this example, the feature name "InputTray4" is stored in printer description data 238 as the PDLKeyword value. Also, UI module 218 retrieves the DisplayName values for the feature and each option and stores the DisplayName values in printer description data 238.

IV. DEVMODE Data Structure

Figure 3:
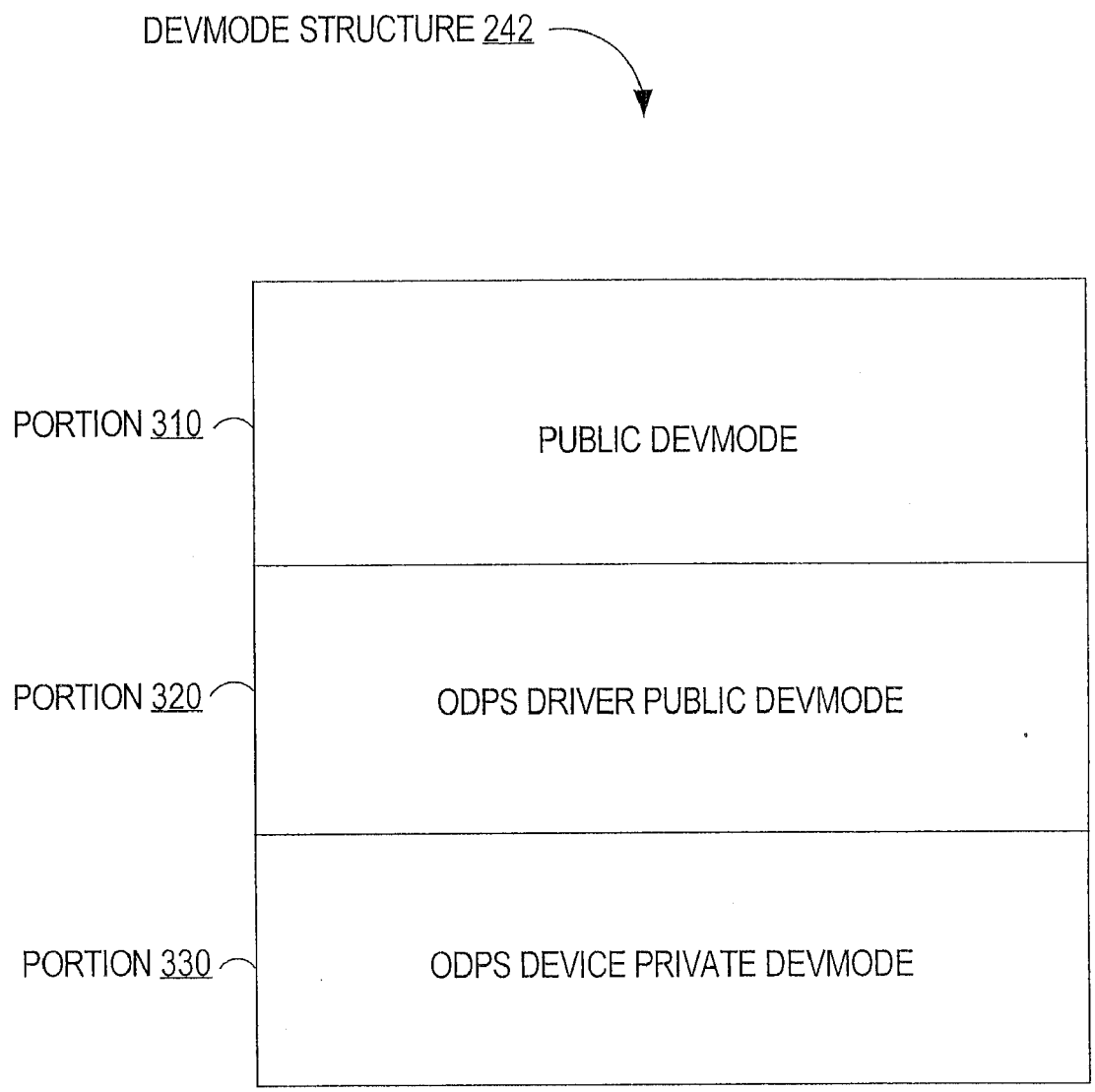
FIG. 3 is a block diagram that depicts different portions of a DEVMODE data structure, according to an embodiment of the invention.

FIG. 3 is a block diagram that depicts different portions of DEVMODE structure 242, according to an embodiment of the invention. DEVMODE structure 242 comprises two public portions 310 and 320 and a private portion 330. Portion 310 is defined by Microsoft and is common to all print drivers for client devices that use an operating system by Microsoft. Portion 310 contains data that indicates device features that are common to many printing devices. Portion 320 contains data that indicates device features that are defined in a Generic Printer Description (GDP) file (required by Microsoft UNIDRV driver and provided by a manufacturer) and that are common to all printing devices of a particular type (e.g., all On-Demand Printing Systems (ODPS) provided by a manufacturer). Microsoft's UNIDRV driver manages portion 320. The data in portions 310 and 320 are stored in a binary format. The data in portions 310 and 320 is also static and not extendable with respect to device features. For example, any device features that are added to Web services-enabled printing device 204 cannot be added to either of portions 310 or 320. Further, even if a device feature that is (a) indicated in either of portions 310 or 320 and (b) subsequently becomes unavailable on Web services-enabled printing device 204, neither portion 310 nor 320 is updatable to indicate that that device feature is unavailable.

Portion 330 contains data that indicates one or more device features that are supported by the corresponding printing device. The devices features indicated in portion 330 are not indicated in either of portions 310 or 320. UI module 218 manages portion 330. The data in portion 330 is stored as XML data. For example, if printing device capabilities data 228 indicates a feature and options for a hole punch capability that is not defined in either portion 310 or portion 320, then, when a user selects an option of the hole punch capability, portion 330 is updated to include XML data that provides support for the hole punch capability. One example of this XML data is:

```
<DeviceFeature Value="HolePunch">
    <FeatureOption Value="Left2"/>
</DeviceFeature>
```

If a device feature that was indicated in portion 330 becomes unavailable on Web services-enabled printing device 204, then portion 330 is updated to either remove that device feature or updated to indicate that that device feature is not currently available.

Figure 4:
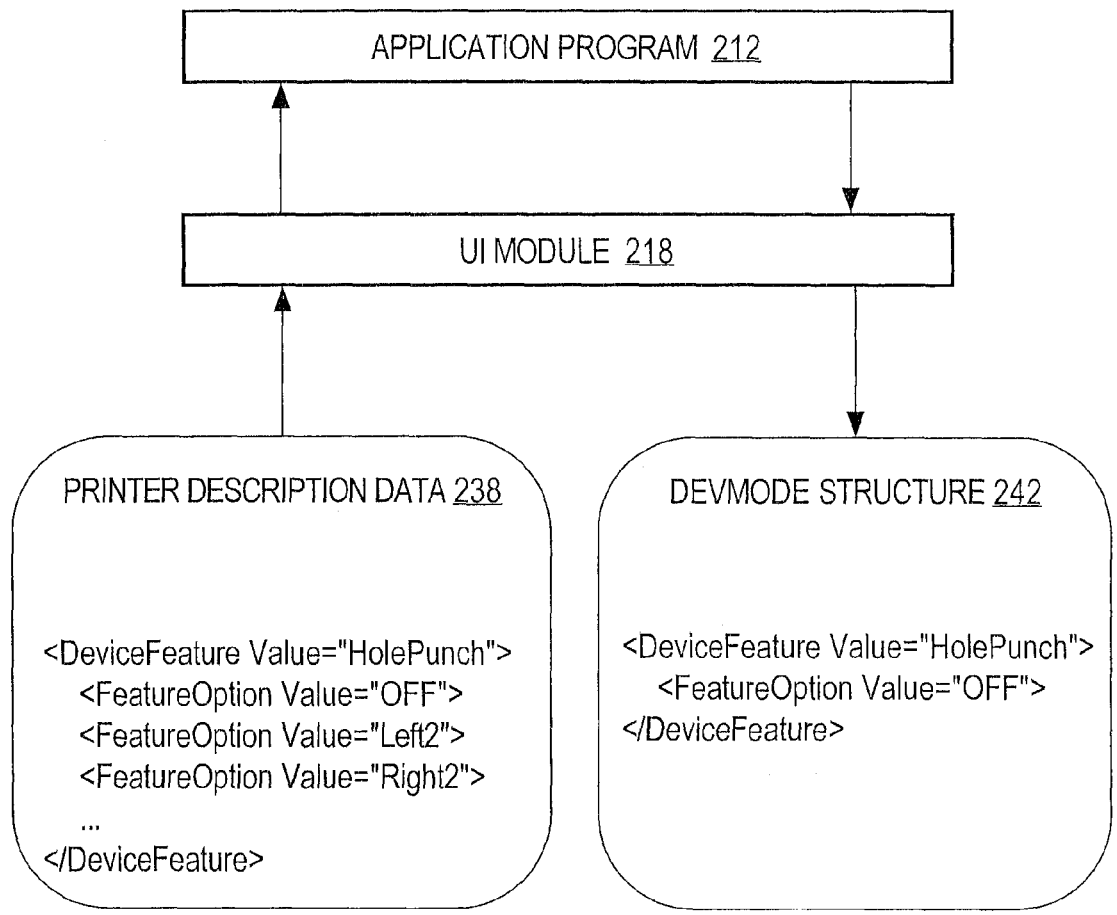
FIG. 4 is a block diagram that depicts a relationship between printer description data and a DEVMODE data structure, according to an embodiment of the invention.

FIG. 4 is a block diagram that depicts a relationship between printer description data 238 and DEVMODE structure 242, according to an embodiment of the invention. DEVMODE structure 242 is generated based at least upon printing device capabilities data 228 or printer description data 238 from Web services-enabled printing device 204. As depicted in FIG. 4, printer description data 238 includes a new device feature entitled "HolePunch" that is not defined in either portion 310 or portion 320. This new device feature includes at least three options: "OFF," "Left2," and "Right2." The "Left2" and "Right2" options indicate the number and locations of holes. After a user (or default) selection, a modified DEVMODE structure 242 indicates that the value selected for the new device feature "HolePunch" is "OFF."

FIG. 4 depicts one of two approaches for populating (or generating an option-selected version of) DEVMODE structure 242. In a first approach (as described above), UI module 218 generates, based on printer description data 238, graphical user interface data which, when processed by application program 212, provides a graphical user interface on user interface 210 for a user to select the features and options to be used when printing an electronic document. Application program 212 saves the user's (and any default) selections to DEVMODE structure 242 to generate a job setting version of DEVMODE structure 242.

In a second approach (not depicted in FIG. 4), application program 212 accesses DEVMODE structure 242 in order to generate a GUI on user interface 210 to present to the requesting user. Application program 212 may access DEVMODE structure 242 directly or indirectly by requesting DEVMODE structure 242 from print driver 216. Application program 212 stores the user (and/or default) selections into DEVMODE structure 242 to create a job setting version. Application program 212 passes the job setting version of DEVMODE structure 242 to print driver 216 for further processing.

V. Updating DEVMODE

Figure 5:
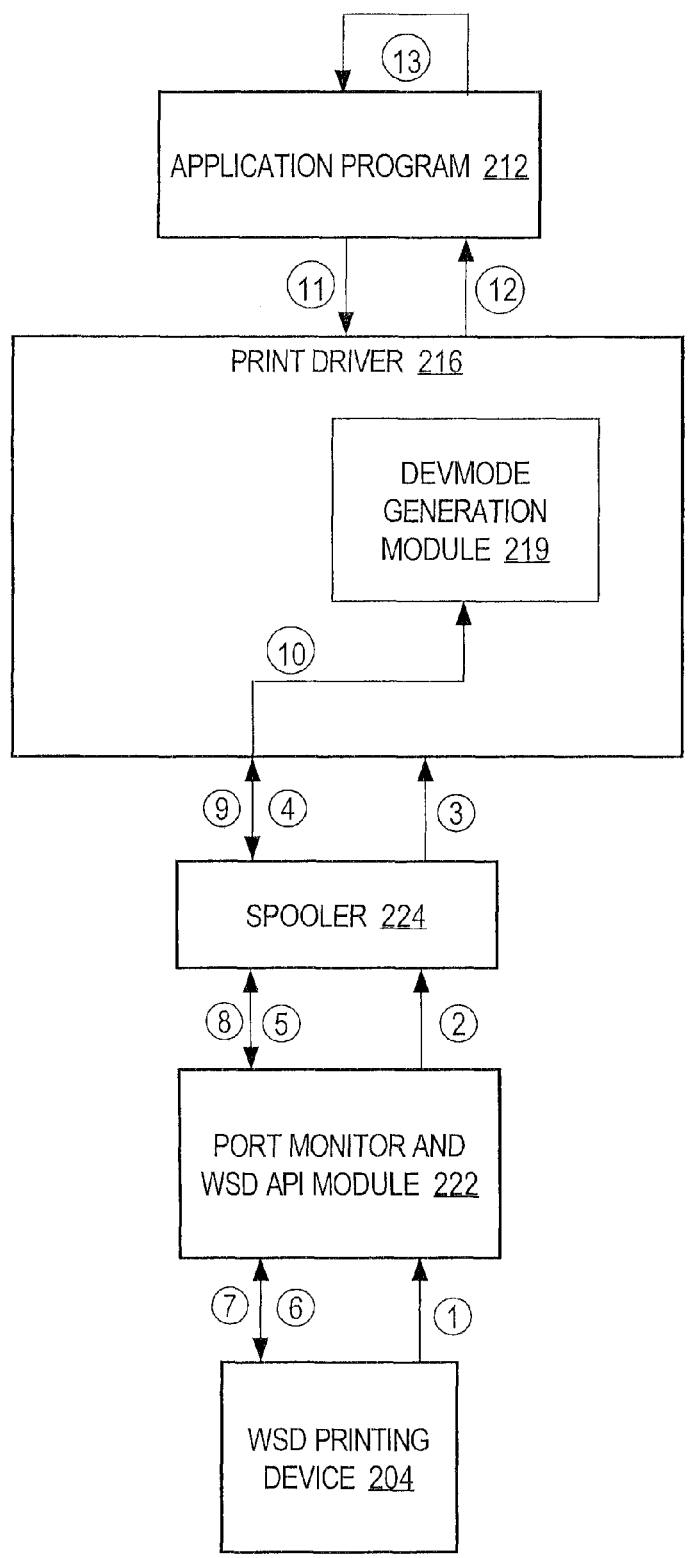
FIG. 5 is a block diagram that depicts how a DEVMODE data structure is updated, according to an embodiment of the invention.

FIG. 5 is a block diagram that depicts how a DEVMODE data structure is updated, according to an embodiment of the invention. In Step 1, Web services-enabled printing device 204 generates an event indicating a change in printing features or options. This may include the deletion, addition or change of a printing feature or option. Port monitor and WSD API module 222 has subscribed to receive this event and receives the event. For example, port monitor and WSD API module 222 may receive an event notification in the form of a SOAP message specifying the event.

In Step 2, port monitor and WSD API module 222 receives the event notification and notifies spooler 224. In Step 3, spooler 224 notifies print driver 216. In Step 4, print driver 216 sends (via spooler 224 in step 5) to the port monitor and WSD API module 222 a request for the device capabilities of Web services-enabled printing device 204. The request may be implemented, for example, by a call to a SendRecvBiDiData function that contains a request for the device capabilities data of Web services-enabled printing device 204. In this situation, the SendRecvBiDiData function makes a call to port monitor and WSD API module 222.

In Step 6, port monitor and WSD API module 222 generates a SOAP request, in the form of a SOAP envelope, based at least upon the request received from print driver 216, and forwards the SOAP request to Web services-enabled printing device 204.

In Step 7, Web services-enabled printing device 204 generates and sends to port monitor and WSD API module 222 a SOAP response (in the form of a SOAP envelope) that includes the device capabilities data for Web services-enabled printing device 204. The device capabilities data for Web services-enabled printing device 204 specifies the features and options currently supported by Web services-enabled printing device 204. The device capabilities data in the SOAP response may include any portion or all of the device capabilities data available on Web services-enabled printing device 204, depending upon a particular implementation. For example, the device capabilities data retrieved in response to the event notification may include all of the device capabilities data available on Web services-enabled printing device 204. Alternatively, only the device capabilities data that corresponds to the change in features or options may be retrieved from Web services-enabled printing device 204. In addition, the device capability data may be retrieved using any number of SOAP requests and responses. The SOAP response may also include a default print ticket that specifies default options for Web services-enabled printing device 204.

In Step 8, port monitor and WSD API module 222 sends, to print driver 216 (via spooler 224 in step 9), a response that contains the device capabilities data of Web services-enabled printing device 204. This may include port monitor and WSD API module 222 extracting XML information from the SOAP response and generating a response that includes the extracted information. In the situation where the request was implemented using a call to SendRecvBiDiData function, the response to the function call contains the device capabilities data from Web services-enabled printing device 204.

In Step 10, DEVMODE generation module 219 generates DEVMODE structure 242 based at least upon printer description data 238 that is generated from the device capabilities data retrieved from Web services-enabled printing device 204. DEVMODE generation module 219 also stores DEVMODE structure 242 in registry 236 as previously described herein. Alternatively, DEVMODE generation module 219 may update the existing DEVMODE structure 242 to reflect the change in the feature(s) and/or options supported by Web services-enabled printing device 204.

In the embodiment where DEVMODE generation module 219 updates an existing DEVMODE structure, if a particular print feature (e.g., hole punch) indicated in printer description data 238 is not defined in a public portion of DEVMODE structure 242, then a private portion of DEVMODE structure 242 may be updated to indicate that particular print feature.

In Step 11, application program 212 makes a request to print driver 216 for DEVMODE structure 242. In Step 12, print driver 216 retrieves DEVMODE structure 242 from registry 236 and sends DEVMODE structure 242 to application program 212. Application program 212 generates a GUI, on user interface 210, to allow a user to view the features and options supported by Web services-enabled printing device 204. In step 13, application program 212 generates an option-selected version of DEVMODE structure 242 based on the user's (and/or any default) selections and sends print data and the option-selected version of DEVMODE structure 242 to print driver 216. Print driver 216 generates a print job ticket based on the option-selected version.

Alternatively, with respect to Steps 11-13, application program 212 requests print driver 216 to generate a GUI. In response, UI module 218 generates a GUI based on DEVMODE structure 242. A user selects one or more feature options displayed on the GUI. UI module 218 saves the user (and any default) selections into an option-selected version of DEVMODE structure 242. Print driver 216 then generates a print job ticket based on the option-selected version. In this scenario, the option-selected version is a job setting version of DEVMODE structure 242.

In a related embodiment, the option-selected version of DEVMODE structure 242 is a default setting version of DEVMODE structure 242. For example, a user may want to view certain settings whenever the user creates a print job. Therefore, the user selects certain features and options and causes such selections to be saved as default settings in DEVMODE structure 242. Subsequently, when the user creates a print job, application program 212 or UI module 218 will generate, based on the default setting version of DEVMODE structure 242, a user interface that displays the default settings.

Figure 6:
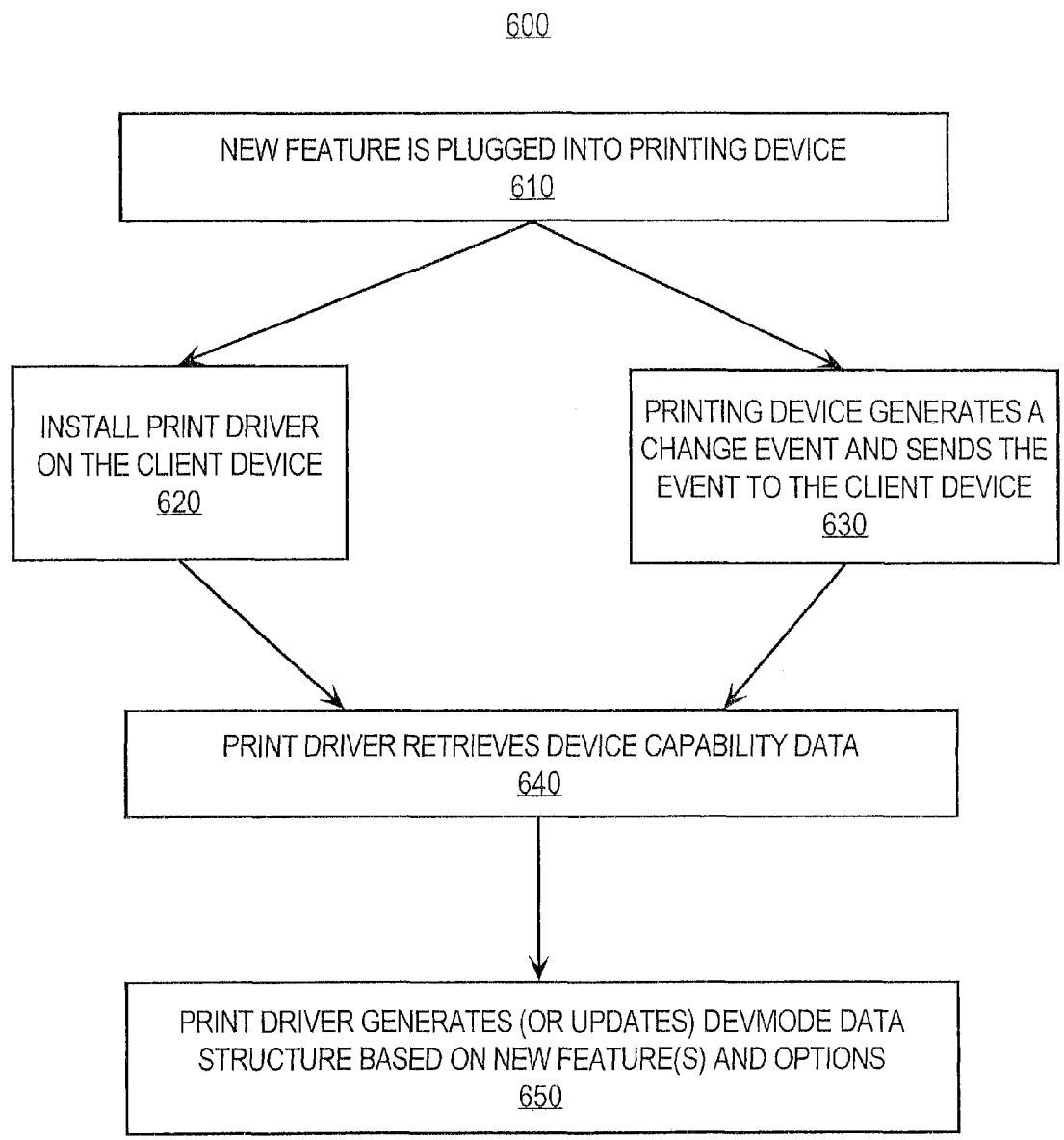
FIG. 6 is a flow diagram that depicts at least two scenarios in which a DEVMODE data structure is generated or updated, according to an embodiment of the invention.

FIG. 6 is a flow diagram that depicts at least two scenarios in which a DEVMODE data structure is generated or updated, according to an embodiment of the invention. In step 610, a new feature is plugged in (or otherwise added) to Web services-enabled printing device 204. The process proceeds either to step 620 or step 630. In step 620, print driver 216 is installed on client device 202. In step 630, Web services-enabled printing device 204 generates a device feature change event and sends the event to client device 202. The process proceeds from either of steps 620 or 630 to step 640. In step 640, print driver 216 retrieves printing device capabilities data 228 from Web services-enabled printing device 204. In step 650, print driver 216 (or DEVMODE generation module 219) generates or updates DEVMODE structure 242 based on the set of features and options indicated in printing device capabilities data 228. Therefore, print driver 216 generates a current version of DEVMODE structure 242 either in response to the print driver being installed or in response to a device feature change event.

Figure 7:
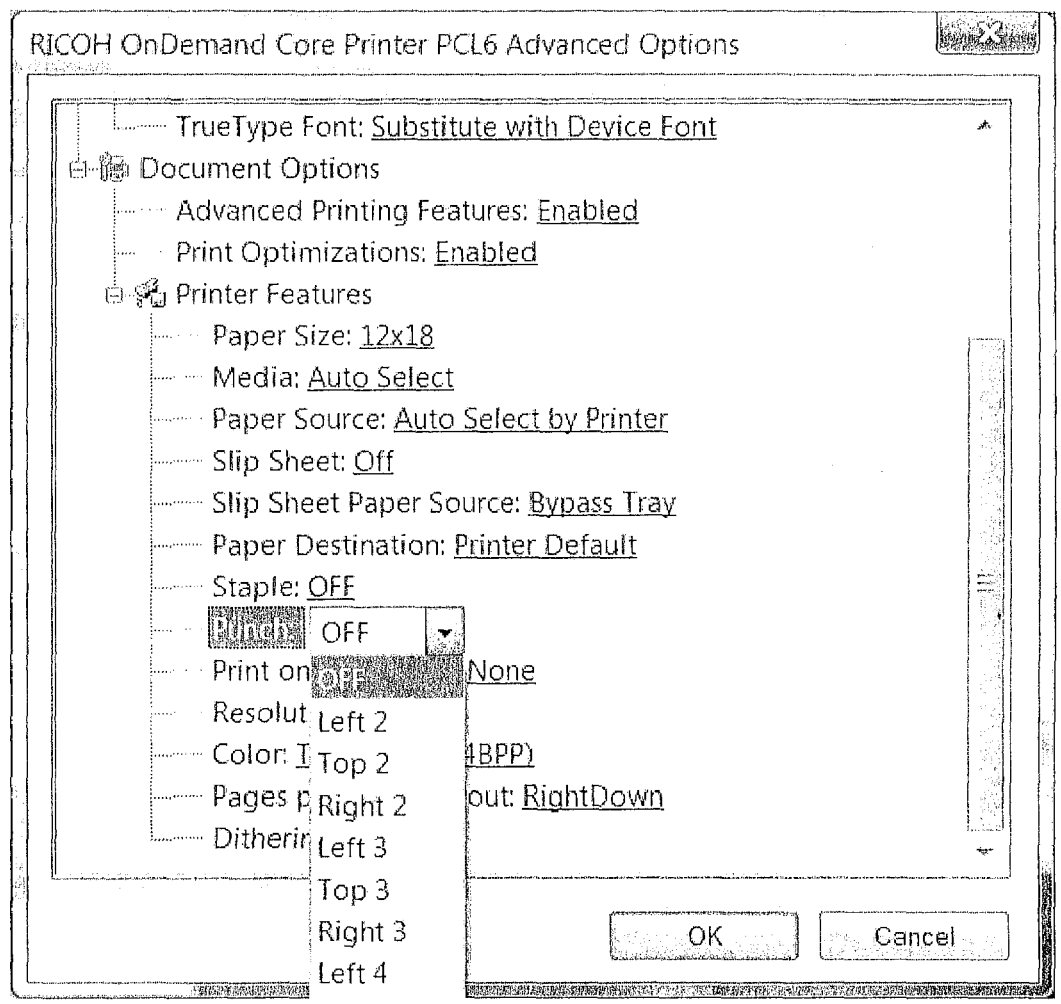
FIG. 7 is a block diagram that depicts a user interface based on a new device feature, according to an embodiment of the invention.

FIG. 7 is a block diagram that depicts a user interface 700 based on a new device feature, according to an embodiment of the invention. Each device feature is typically associated with a plurality of options, one of which is selected for the feature for a print job. In this example, the new device feature is "HolePunch," which is depicted in UI 700 as "Punch." The various options associated with this new device feature are "OFF," "Left 2," "Top 2," "Right 2," "Left 3," "Top 3," "Right 3," and "Left 4."

Figure 8:
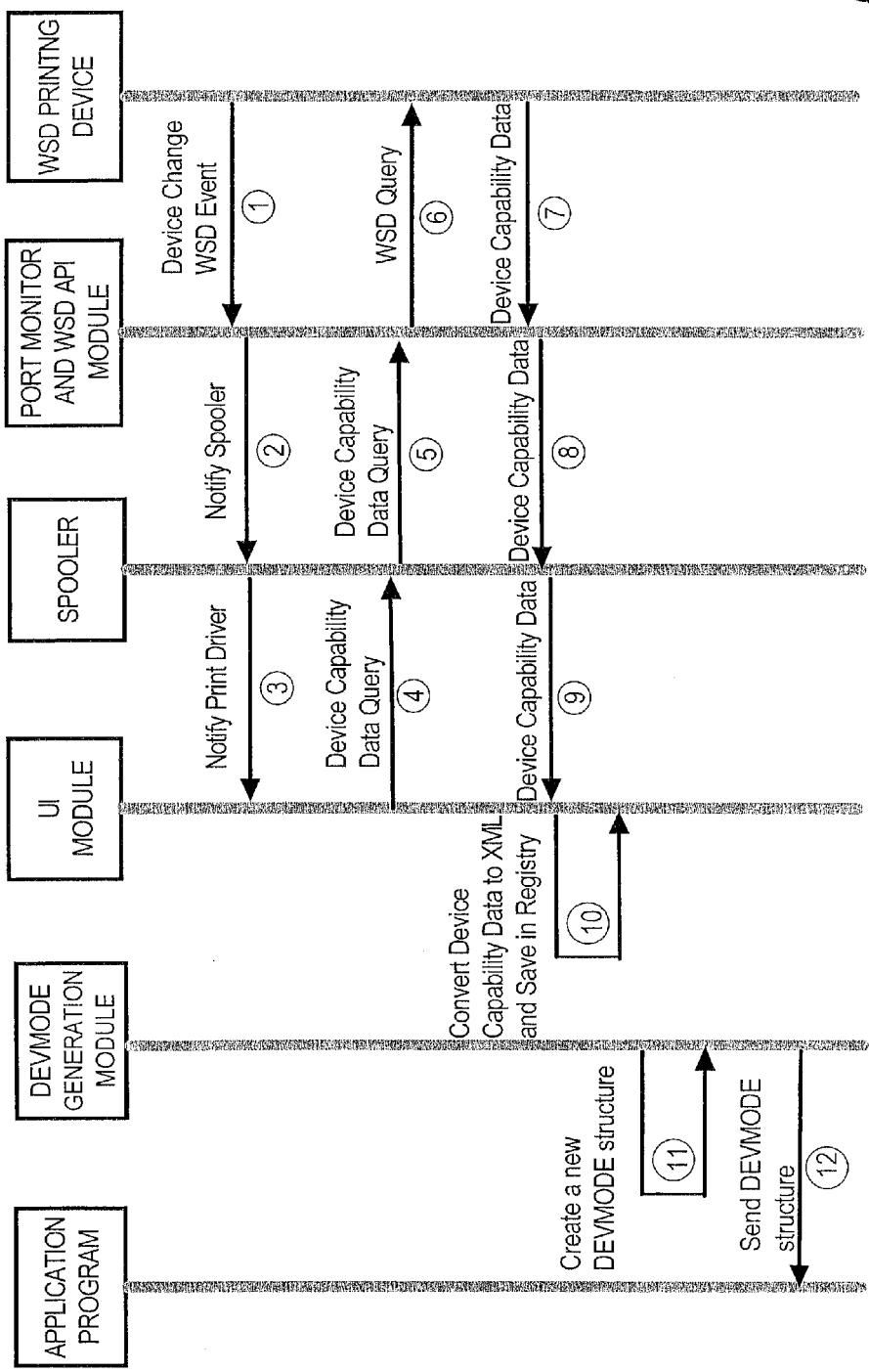
FIG. 8 is a sequence diagram that depicts a process for updating a DEVMODE data structure based on a new device feature and corresponding options, according to an embodiment of the invention.

FIG. 8 is a sequence diagram that depicts a process for updating a DEVMODE data structure based on a new device feature and corresponding options, according to an embodiment of the invention. In Step 1, Web services-enabled printing device 204 generates an event indicating a change in printing features or options. This may include the deletion, addition, or change of a device feature or option. Port monitor and WSD API module 222 has subscribed to receive this event and receives the event. For example, port monitor and WSD API module 222 may receive an event notification in the form of a SOAP message specifying the event.

In Step 2, port monitor and WSD API module 222 receives the event notification and notifies spooler 224. In Step 3, spooler 224 notifies UI module 218. In Step 4, UI module 218 sends, to port monitor and WSD API module 222 (via spooler 224 in Step 5), a request for the device capabilities of Web services-enabled printing device 204. The request may be implemented, for example, by a call to a SendRecvBiDiData function that contains a request for the device capabilities data of Web services-enabled printing device 204. In this situation, the SendRecvBiDiData function makes a call to port monitor and WSD API module 222.

In Step 6, port monitor and WSD API module 222 generates a SOAP request, in the form of a SOAP envelope, based at least upon the request received from UI module 218, and forwards the SOAP request to Web services-enabled printing device 204.

In Step 7, Web services-enabled printing device 204 generates and sends to port monitor and WSD API module 222 a SOAP response (in the form of a SOAP envelope) that includes the device capabilities data for Web services-enabled printing device 204. The device capabilities data for Web services-enabled printing device 204 specifies one or more features and options currently supported by Web services-enabled printing device 204. The device capabilities data in the SOAP response may include any portion or all of the device capabilities data available on Web services-enabled printing device 204, depending upon a particular implementation. For example, the device capabilities data retrieved in response to the event notification may include all of the device capabilities data available on Web services-enabled printing device 204. Alternatively, only the device capabilities data that corresponds to the change in features or options may be retrieved from Web services-enabled printing device 204. In addition, the device capability data may be retrieved using any number of SOAP requests and responses.

In Step 8, port monitor and WSD API module 222 sends, to UI module 218 (via spooler 224 in Step 9), a response that contains the device capabilities data of Web services-enabled printing device 204. This may include port monitor and WSD API module 222 extracting XML information from the SOAP response and generating a response that includes the extracted information. In the situation where the request was implemented using a call to SendRecvBiDiData function, the response to the function call contains the device capabilities data from Web services-enabled printing device 204.

In Step 10, UI module 218 generates printer description data 238 for Web services-enabled printing device 204 and stores printer description data 238 in registry 236 as previously described herein. Alternatively, UI module 218 may update the existing printer description data for Web services-enabled printing device 204 to reflect the change in the features and/or options made to Web services-enabled printing device 204.

In Step 11, DEVMODE generation module 219 generates a new DEVMODE structure (or updates existing DEVMODE structure 242) based at least upon the new or deleted feature.

In Step 12, application program 212 requests DEVMODE structure 242 from print driver 216 and generates a user interface based on the new (or updated) DEVMODE structure 242.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
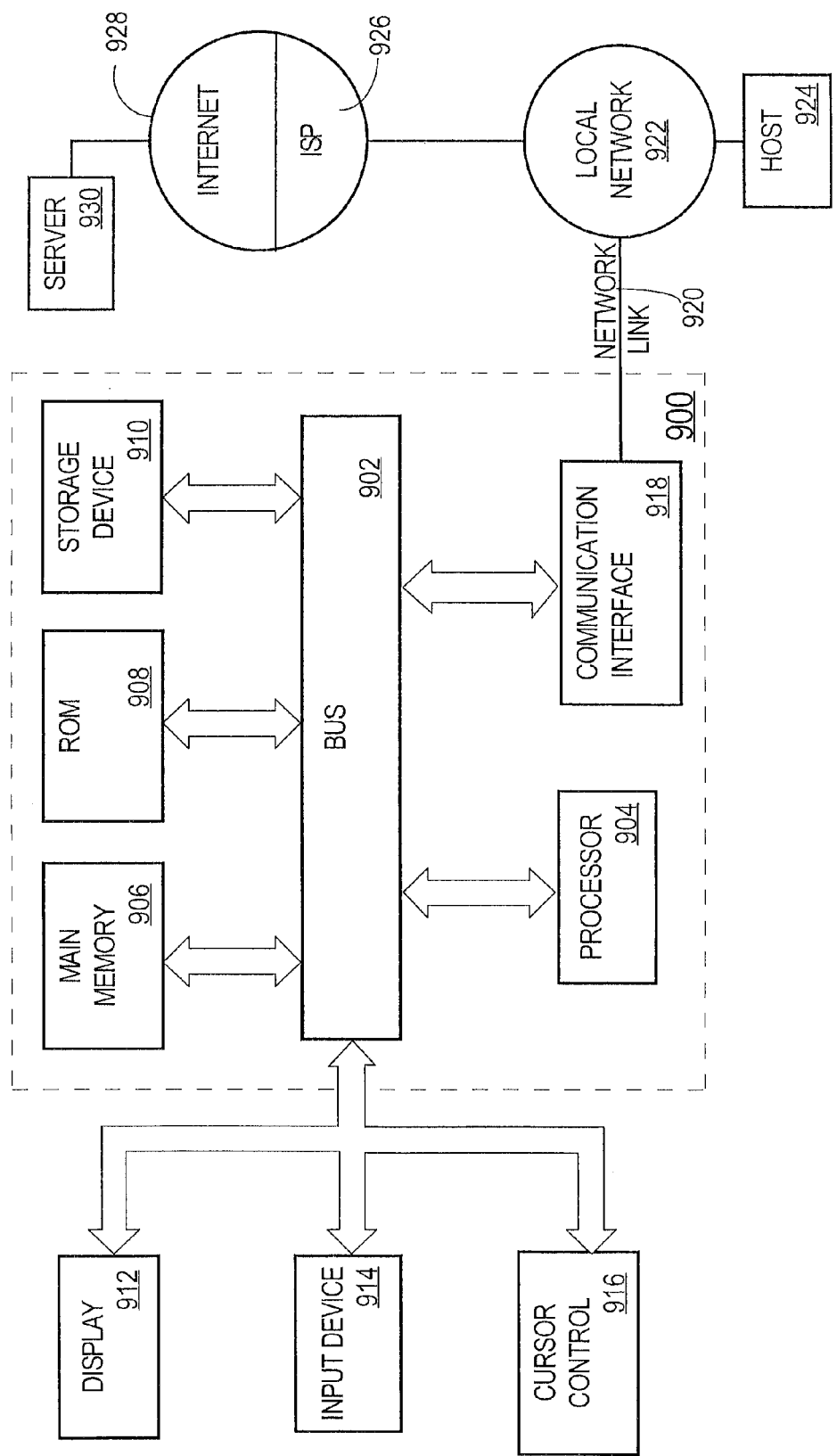
FIG. 9 is a block diagram that depicts a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for printing to a Web services-enabled printing device, comprising:
a print driver executing on a client device and receiving, from the Web services-enabled printing device, printing device capability data that specifies a plurality of features and options currently supported by the Web services-enabled printing device;
in response to receiving the printing device capability data, the print driver generating a second version of a particular data structure that is different than a first version of the particular data structure;
wherein the first version indicates a first plurality of features that were previously supported by the Web services-enabled printing device;
wherein the second version indicates a second plurality of features that are currently supported by the Web services-enabled printing device;
wherein the first plurality of features are different than the second plurality of features;
wherein data in a first portion of the second version is represented in a binary format and data in a second portion of the second version is represented in XML;
wherein the second portion indicates a particular print feature and one or more options for the particular print feature that are indicated in the printing device capability data;
after the print driver generates the second version of the particular data structure, generating a print job based on the second version of the particular data structure.

2. The computer-implemented method of claim 1, wherein the particular data structure is a DEVMODE data structure, further comprising:
generating a user interface based on the second version of the DEVMODE data structure;
in response to one or more user selections, generating a third version of the DEVMODE data structure that indicates that an option is selected for each feature of a set of features of the second plurality of features; and
the print driver generating a print job ticket based at least upon the third version of the DEVMODE data structure and causing print data and the print job ticket to be transmitted to the Web services-enabled printing device.

3. The computer-implemented method of claim 1, further comprising:
an application program that is separate from the print driver generating, based on the second version of the particular data structure, a user interface after requesting the particular data structure from the print driver and receiving the second version of the particular data structure from the print driver.

4. The computer-implemented method of claim 1, wherein:
the printing device capability data is second printing device capability data;
the method further comprising, prior to the print driver receiving the second printing device capability data:
the print driver receiving, from the Web services-enabled printing device, first printing device capability data that is different than the second printing device capability data;
in response to receiving the first printing device capability data, the print driver generating the first version of the particular data structure.

5. The computer-implemented method of claim 1, wherein receiving the printing device capability data is initiated in response to:
the print driver receiving, from the Web services-enabled printing device, an event notification message that indicates a change with respect to the Web services-enabled printing device, wherein the event notification message conforms to a Web Services Eventing specification; and
in response to receiving the event notification message, the print driver sending, to the Web services-enabled printing device, a request message that requests one or more print features supported by the Web services-enabled printing device.

6. The computer-implemented method of claim 1, wherein receiving the printing device capability data is initiated in response to the client device installing the print driver.

7. The computer-implemented method of claim 1, wherein:
the first plurality of features includes a first particular feature that is not included in the second plurality of features; or
the second plurality of features includes a second particular feature that is not included in the first plurality of features.

8. One or more non-transitory storage media storing instructions for printing to a Web services-enabled printing device, the instructions, when processed by one or more processors, cause:
a print driver executing on a client device and receiving, from the Web services-enabled printing device, printing device capability data that specifies a plurality of features and options currently supported by the Web services-enabled printing device;
in response to receiving the printing device capability data, the print driver generating a second version of a particular data structure that is different than a first version of the particular data structure;
wherein the first version indicates a first plurality of features that were previously supported by the Web services-enabled printing device;
wherein the second version indicates a second plurality of features that are currently supported by the Web services-enabled printing device;
wherein the first plurality of features are different than the second plurality of features;
wherein data in a first portion of the second version is represented in a binary format and data in a second portion of the second version is represented in XML;
wherein the second portion indicates a particular print feature and one or more options for the particular print feature that are indicated in the printing device capability data;
after the print driver generates the second version of the particular data structure, generating a print job based on the second version of the particular data structure.

9. The one or more non-transitory storage media of claim 8, wherein the particular data structure is a DEVMODE data structure, wherein the instructions include additional instructions which, when processed by the one or more processors, further cause:
generating a user interface based on the second version of the DEVMODE data structure;
in response to one or more user selections, generating a third version of the DEVMODE data structure that indicates that an option is selected for each feature of a set of features of the second plurality of features; and
the print driver generating a print job ticket based at least upon the third version of the DEVMODE data structure and causing print data and the print job ticket to be transmitted to the Web services-enabled printing device.

10. The one or more non-transitory storage media of claim 8, wherein the instructions, when executed by the one or more processors, further cause:
an application program that is separate from the print driver generating, based on the second version of the particular data structure, a user interface after requesting the particular data structure from the print driver and receiving the second version of the particular data structure from the print driver.

11. The one or more non-transitory storage media of claim 8, wherein:
the printing device capability data is second printing device capability data;
the instructions, when executed by one or more processors, further cause, prior to the print driver receiving the second printing device capability data:
the print driver receiving, from the Web services-enabled printing device, first printing device capability data that is different than the second printing device capability data;
in response to receiving the first printing device capability data, the print driver generating the first version of the particular data structure.

12. The one or more non-transitory storage media of claim 8, wherein receiving the printing device capability data is initiated in response to:
the print driver receiving, from the Web services-enabled printing device, an event notification message that indicates a change with respect to the Web services-enabled printing device, wherein the event notification message conforms to a Web Services Eventing specification; and
in response to receiving the event notification message, the print driver sending, to the Web services-enabled printing device, a request message that requests one or more print features supported by the Web services-enabled printing device.

13. The one or more non-transitory storage media of claim 8, wherein receiving the printing device capability data is initiated in response to the client device installing the print driver.

14. The one or more non-transitory storage media of claim 8, wherein:
the first plurality of features includes a first particular feature that is not included in the second plurality of features; or
the second plurality of features includes a second particular feature that is not included in the first plurality of features.

15. An apparatus for printing to a Web services-enabled printing device, the apparatus comprising a memory storing instructions which, when processed by one or more processors, cause:
a print driver executing on a client device and receiving, from the Web services-enabled printing device, printing device capability data that specifies a plurality of features and options currently supported by the Web services-enabled printing device;
in response to receiving the printing device capability data, the print driver generating a second version of a particular data structure that is different than a first version of the particular data structure;
wherein the first version indicates a first plurality of features that were previously supported by the Web services-enabled printing device;
wherein the second version indicates a second plurality of features that are currently supported by the Web services-enabled printing device;
wherein the first plurality of features are different than the second plurality of features;
wherein data in a first portion of the second version is represented in a binary format and data in a second portion of the second version is represented in XML;

wherein the second portion indicates a particular print feature and one or more options for the particular print feature that are indicated in the printing device capability data;

after the print driver generates the second version of the particular data structure, generating a print job based on the second version of the particular data structure.

16. The apparatus of claim 15, wherein the particular data structure is a DEVMODE data structure, wherein the instructions, when processed by the one or more processors, further cause:

generating a user interface based on the second version of the DEVMODE data structure;

in response to one or more user selections, generating a third version of the DEVMODE data structure that indicates that an option is selected for each feature of a set of features of the second plurality of features; and the print driver generating a print job ticket based at least upon the third version of the DEVMODE data structure and causing print data and the print job ticket to be transmitted to the Web services-enabled printing device.

17. The apparatus of claim 16, wherein the instructions, when executed by the one or more processors, further cause:

an application program that is separate from the print driver generating, based on the second version of the particular data structure, a user interface after requesting the particular data structure from the print driver and receiving the second version of the particular data structure from the print driver.

18. The apparatus of claim 15, wherein:

the printing device capability data is second printing device capability data;

the instructions, when executed by the one or more processors, further cause, prior to the print driver receiving the second printing device capability data:

the print driver receiving, from the Web services-enabled printing device, first printing device capability data that is different than the second printing device capability data;

in response to receiving the first printing device capability data, the print driver generating the first version of the particular data structure.

19. The apparatus of claim 15, wherein receiving the printing device capability data is initiated in response to:

the print driver receiving, from the Web services-enabled printing device, an event notification message that indicates a change with respect to the Web services-enabled printing device, wherein the event notification message conforms to a Web Services Eventing specification; and in response to receiving the event notification message, the print driver sending, to the Web services-enabled printing device, a request message that requests one or more print features supported by the Web services-enabled printing device.

20. The apparatus of claim 15, wherein receiving the printing device capability data is initiated in response to the client device installing the print driver.

* * * * *